United States Patent [19]
Dhooge

[11] Patent Number: 4,752,364
[45] Date of Patent: Jun. 21, 1988

[54] METHOD FOR TREATING ORGANIC WASTE MATERIAL AND A CATALYST/COCATALYST COMPOSITION USEFUL THEREFOR

[75] Inventor: Patrick M. Dhooge, Corrales, N. Mex.

[73] Assignee: Delphi Research, Inc., Albuquerque, N. Mex.

[21] Appl. No.: 864,410

[22] Filed: May 19, 1986

[51] Int. Cl.$^4$ ............................. C25F 5/00; C25F 1/46
[52] U.S. Cl. ..................................... 204/151; 204/102; 204/131; 204/149
[58] Field of Search ...................... 204/130, 131–138, 204/149–152, 102; 210/763

[56] References Cited

U.S. PATENT DOCUMENTS

| | | | |
|---|---|---|---|
| 2,433,871 | 2/1965 | Sutherland et al. | 204/131 |
| 4,105,755 | 8/1978 | Darnell et al. | 204/131 |
| 4,182,662 | 1/1980 | Hart . | |
| 4,212,735 | 7/1980 | Miller | 210/763 |
| 4,222,826 | 9/1980 | Riggs et al. | 204/130 |
| 4,235,863 | 11/1980 | Schulten et al. . | |
| 4,268,303 | 5/1981 | Coughlin | 204/39 |
| 4,269,678 | 5/1981 | Faul et al. | 204/130 |
| 4,274,926 | 6/1981 | Simon et al. | 204/39 |
| 4,279,710 | 7/1981 | Coughlin | 204/101 |
| 4,311,569 | 1/1982 | Dempsey et al. . | |
| 4,341,608 | 7/1982 | St. John . | |
| 4,389,288 | 6/1983 | Vaughan | 204/129 |
| 4,395,316 | 7/1983 | St. John . | |
| 4,412,893 | 11/1983 | Fray et al. | 204/129 |
| 4,457,824 | 7/1984 | Dempsey et al. . | |

OTHER PUBLICATIONS

Hackh's Chemical Dictionary, Fourth Ed.
Dhooge et al. "Electrochemical Studies of Coal Slurry Oxidation Mechanisms, J. Electrochem. Soc., *129*, No. 8., Aug. 1982, pp. 1719–1724.
Dhooge et al. "Electrochemistry of Coal Slurries", J. Electrochem. Soc., *130*, No. 5., May 1983, pp. 1029–1036.
Dhooge et al. "Electrochemistry of Coal Slurries III", J. Electrochem. Soc., *130*, 1539 (1983).

*Primary Examiner*—R. L. Andrews
*Attorney, Agent, or Firm*—Berman, Aisenberg & Platt

[57] ABSTRACT

A catalyst/cocatalyst composition of matter is useful in electrolytically treating organic waste material. Use of the catalyst/cocatalyst composition causes the reaction rate to increase, and causes the anode potential and the energy required for the reaction to decrease. An electrolyte, including the catalyst/cocatalyst composition, and a reaction medium composition further including organic waste material are also described.

22 Claims, 1 Drawing Sheet

METHOD FOR TREATING ORGANIC WASTE MATERIAL AND A CATALYST/COCATALYST COMPOSITION USEFUL THEREFOR

FIELD OF THE INVENTION

This invention relates to the use of a catalyst composition, comprising an electrocatalyst and a homogeneous cocatalyst, for the electrochemical gasification of organic waste material in an electrolyte.

CROSS-REFERENCE TO RELATED APPLICATION

A related application entitled "A method for hydrogen production and metal winning, and a catalyst/cocatalyst composition useful therefor" is being filed concurrently herewith, and the specification thereof is incorporated herein by reference.

BACKGROUND OF THE INVENTION

Carbonaceous materials are oxidized when suspended in an electrolyte containing a reversible or quasireversible electrocatalyst and a homogeneous cocatalyst. The electrocatalyst is regenerated in an electrochemical cell through which a direct current is passed. The reduced electrocatalyst is reoxidized at the anode.

U.S. Pat. No. 4,412,893 concerns electrolyzing cations at a cathode of an electrolytic cell, wherein anolyte contains ferrous ion as a reducing agent. The electrolysis is conducted while the anolyte is agitated or while the anode moves with respect to the anolyte, providing relative motion between the anode and the anolyte, promoting contact of the anode with the ferrous ion despite their mutual electrostatic repulsion. A static relationship between the cathode and the catholyte is required. The concentration of the ferrous ion is in the range from 0.5 to 10 grams per liter.

U.S. Pat. No. 4,389,288 relates to electrochemical gasification of carbonaceous material by anodic oxidation in an aqueous acidic electrolyte to produce oxides of carbon at the anode and hydrogen at the cathode of an electrolytic cell using an iron catalyst.

U.S. Pat. No. 4,268,363 provides for electrochemical gasification of carbonaceous materials by anodic oxidation, producing oxides of carbon at the anode and hydrogen or metallic elements at the cathode of an electrolytic cell. Carbonaceous materials may also be hydrogenated at the cathode by electrochemical reactions during which carbonaceous material may also be anodically reacted within the anode compartment of an electrolytic cell. Typical examples of metals produced at the cathode include chromium, manganese, cobalt, nickel, copper, indium, and tellurium.

According to U.S. Pat. No. 4,341,608, hydrogen is produced from an electrolytic cell system by oxidizing a biomass product using a process of depolarizing the anode of an aqueous electrolytic cell. Particular catalyst systems are not disclosed.

U.S. Pat. No. 4,279,710 presents an electrochemical method and associated apparatus for gasification of carbonaceous materials to carbon dioxide with the attendant formation of fuels or high-energy intermediates, such as hydrogen or light hydrocarbons, and production of electric power. No particular catalyst systems are disclosed.

In U.S. Pat. No. 4,311,569, an improved catalytic anode of a ternary platinum group reduced metal oxide is used alone or in combination with platinum group metals and/or platinum group metal oxides or mixtures having at least one valve-metal component, such as titanium, hafnium, zirconium, niobium, tantalum, and tungsten, in a process for electrolytically generating oxygen. The invention of U.S. Pat. No. 4,457,824 is an improvement on the same method. In these two patents, the catalysts are in the electrodes, and thus are not available in solution for homogenous oxidation of any dissolved organics. Oxidation of organic materials using catalytic electrodes is not shown or suggested.

U.S. Pat. No. 4,105,755 concerns reacting an ash-containing carbonaceous material, optionally an organic waste material, with a halogen, to form a halogen acid, and then decomposing the halogen acid to halogen (recycled) and hydrogen. The halogen acid is preferably decomposed electrolytically if this step of the reaction takes place as a separate step from the initial reaction of the ash-containing carbonaceous material and halogen.

SUMMARY OF THE INVENTION

An object of the present invention is to provide an electrocatalytic reactor system in which organic waste material is oxidized using a catalyst/cocatalyst combination in an electrolyte in an electrochemical cell. The over-all reactions in the anode half-cell and in the cathode half-cell in aqueous acidic solutions are:

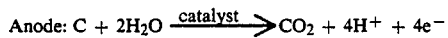

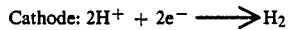

The process employs one of several electrocatalysts together with one of several homogeneous cocatalysts to improve the organic oxidation rate and to lower the activation energy for the oxidiation of the organic waste material.

Another object of the invention is to provide a method of using a catalyst/cocatalyst composition for the treatment of organic waste material. A further object of the invention is to provide an electrolyte composition comprising organic waste material, a conductive electrolyte, catalyst and cocatalyst.

There are several distinct aspects of this invention:
(a) a catalyst/cocatalyst composition,
(b) use of (a) in a method of electrolytically treating organic waste material,
(c) use of (a) to reduce potential and thus energy required to gasify organic waste material electrochemically,
(d) an electrolyte composition comprising (a), and
(e) a reaction medium composition comprising organic waste material in (d).

Component (a) is an indispensable subcombination of each of the other aspects of the invention. The dispersion of (a) throughout the electrolyte composition imparts homogeneity to the distribution of the cocatalyst and of the catalyst.

The benefits derived from use of the catalyst/cocatalyst are many. The process for treating organic waste material significantly reduces the amount of solids electrochemically, producing gaseous products and some residue; it minimizes the amount of waste material which must be dumped or otherwise disposed of. Likewise, an increase in reaction rates using the catalyst/cocatalyst combination (a) provides energy-saving economy.

DETAILED DESCRIPTION OF THE INVENTION

Figure 1:
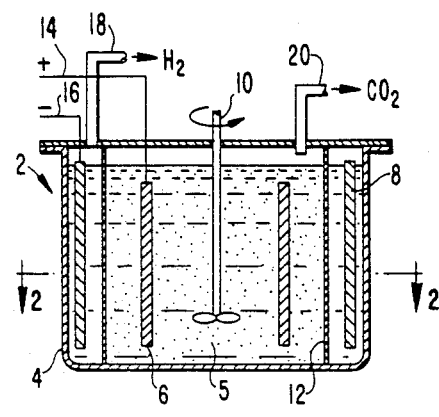
FIG. 1 is a vertical sectional view of an electrochemical cell useful for practicing the invention.

In the process of the invention organic waste material is oxidized in an electrolytic cell. The reaction at the anode is a mediated, or electrocatalytic, reaction in which the oxidized form of a reversible redox couple, produced at the anode, subsequently oxidizes carbon of the organic waste material. The products of the carbon oxidation are carbon oxides and the reduced form of the redox couple, which is reoxidized at the anode. The process described herein employs one of several electrocatalysts along with one of several homogeneous cocatalysts to improve the organic oxidation rate and to lower the activation energy required for the oxidation of the organic material. Obtained data show that the mechanism of the organic oxidation is changed by the homogeneous cocatalyst, which apparently forms an electron transfer complex involving the electrocatalyst. This results in improvement in reaction rate and/or lowering of activation energies.

The electron transfer complex must exit at least momentarily to account for increased oxidation rates and lowered activation energies of the reactions taking place. It is postulated that the oxidation mechanism involves a short-lived coordination complex between the organic compound and the homogeneous cocatalyst, such as that of platinum ions or palladium ions and the double bonds of organic compounds, e.g., Ziese's salt anion, the trichloro(ethylene)platinate (II) ion, which is stable in aqueous solution. Similar platinum-organic double-bond complexes are apparently formed in catalyst mixtures of this invention. The standard potential of the iron (II)/iron (III) redox couple in 1.0M sulfuric acid is $+0.69$ V. The standard potential of platinum (IV)/platinum (II) redox couple in 1.0M sulfuric acid is also approximately $+0.69$ V. Thus, the platinum (II) species is in equilibrium with the platinum (IV) species, iron (III) and iron (II), and can be considered to be complexed for at least short periods of time to organic double bonds or other appropriate functionality on the organic compounds. The increase in reaction rate produced by platinum, palladium, rhodium and ruthenium is due to the fact that the homogeneous cocatalyst/organic complexes are more long-lived than the electrocatalyst/organic complexes and thus are more efficient at transferring electrons. Lowered activation energies are accounted for by the lower activation energy necessary for formulation of the organic compound-homogeneous cocatalyst complex. The required supply of oxidizing electrons can be derived from direct reduction of the cocatalyst, followed by reoxidation by the electrocatalyst, or by formation of a short-lived electrocatalyst/cocatalyst/organic complex in which the cocatalyst compound acts as a bridge to transfer an electron from the organic compound to the electrocatalyst. Thus, the electron transfer complex (ETC) involved in the oxidation forms spontaneously when the homogeneous cocatalyst is added to an electrolyte containing dissolved or suspended organic compounds which have functional groups or bonds capable of interacting with the cocatalyst. The relative weight ratios vary with the type of organic compound, the type of cocatalyst and the electrocatalyst. Preferred ranges of proportions for each component are relatively large amounts of organic material (an activity for the organic of 1 or more), a great concentration of the electrocatalyst (activity of 0.1 to 1.0 or more) and a smaller concentration of the cocatalyst compound (activity of 0.01 to 0.001 or less). The ETC is formed in an electrolyte which solvates the catalysts and at a temperature of 0° C. or higher with an organic material with functionalities which can interact with the cocatalyst, and in the absence of any interfering conditions, such as species which tie up or precipitate the catalysts. The species which precipitate the catalysts are those which form insoluble salts with the catalysts, such as (for the metals) hydroxide, silicate, sulfide, high concentrations of sulfate or high concentrations of phosphate, and (for bromine) silver cation, gold cation or mercury cation. Species or substances which tie up the catalysts include highly absorptive inert materials such as clay or activated carbon, or compounds with which the catalysts react irreversibly, such as the reaction of bromine with an organic compound to form bromoform or tetrabromomethane.

The electrocatalyst is obtained as pure catalyst, from various salts or compounds of the electrocatalyst, or from impurities in the organic material.

The solutions usually used in the catalytic system dissolve many metal oxides, sulfides, many metal salts, etc. If any of these compounds exist as impurities in the organic waste used in the reactor, they will be leached out by the solution. Iron is one of the most common metals found in sewage sludge, manure and many other biological wastes, and so can supply part or all of the electrocatalyst once leached from the organic material. Bromine or iodine, found in sufficient quantity in some waste materials, particularly brominated or iodinated organics, can supply the necessary electrocatalyst concentration. The electrocatalyst is usually added to the electrolyte, as there is not enough normally found in waste materials to develop the desired reaction rate, but some waste materials supply their own electrocatalyst, e.g. when leachable iron, bromine or iodine is present in sufficient quantity in the waste material. It is doubtful that any waste material will contain sufficient quantities of copper, nickel, platinum, vanadium, etc., to supply their own cocatalyst as well, but such is not precluded. Whether the electrocatalyst and cocatalyst are added as metals, metal salts, etc., or leached from the organic waste material does not affect the nature of the process described herein. The catalyst materials are identified by chemical analysis of the waste material to determine catalyst content (if any), and by chemical analysis of the electrolyte solution (after it has been thoroughly mixed with the waste and allowed to stand for, e.g., from 24 to 72 hours).

The homogeneous cocatalyst is optionally obtained from pure cocatalyst metal, from various salts or compounds of the cocatalyst, or from impurities in the organic material. The homogeneous cocatalyst is dissolved in or homogeneously distributed throughout the catalyst solution. This is advantageous in that it eliminates one heterogeneous step in the process of transfer of electrons from the electrocatalyst and in that the cocatalyst is available to the entire surface of any solid organic particles immersed in the catalyst solution. The cocatalyst is homogeneous with the electrocatalyst solution, it is a single ion complex (not an admixture), and the homogeneity of the cocatalyst is very critical to the increased reaction rates observed.

The employed electrolyte is any solution in which the electrocatalyst and cocatalyst are soluble at least in reduced form, but is typically a solution of a strong mineral acid, such as hydrochloric acid, phosphoric acid or sulfuric acid. The acid solution provides a solubilizing medium for the catalyst composition. The system is satisfactorily operated at various temperatures, depending on the catalyst combination and the organic source; temperatures from 70° C. to 200° C. are typical. However, temperatures from 0° C. to 500° C. or more may be used.

The principle advantage of the process is that it effects the oxidation (without burning, standard chemical oxidation or biological digestion) of most organic materials directly to simple compounds. Chemical analysis of gaseous products and anolyte solutions after oxidation indicates that the process is clean and efficient, leaving little residue. The organic waste/electrocatalyst/homogeneous cocatalyst combination acts as a depolarizing agent to reduce the potential applied at the anode.

Examples of organic waste material or biomass suitable for practicing the invention are woody wastes, cattle manure, garbage, sewage sludge, various industrial chemical wastes, food and fiber processing by-products or waste, or any organic material which has a positive cost of disposal.

Examples of catalyst compositions useful for practicing the invention are various combinations of metal ion complexes and/or oxidizing halogens. The complexes vary and depend upon the composition of the solution and the nature of the organic waste material. Non-limiting examples of electrocatalysts are cerium (4+) ion complex, iron (3+) ion complex, bromine and iodine. Non-limiting examples of homogeneous cocatalysts are platinum (4+) ion complex, ruthenium (3+) ion complex, rhodium (3+) ion complex, nickel (2+) ion complex, cobalt (2+) ion complex, palladium (2+) ion complex, copper (2+) ion complex and vanadium (5+) oxide complex. The catalyst solutions are made by dissolving the halogen, metal, and/or soluble metal salt in an electrolyte solution. Useful combinations of electrocatalyst and homogeneous cocatalyst include:

iron$^{3+}$ with platinum$^{4+}$ (urea, wood cellulose, manure and/or fat)
iron$^{3+}$ with vanadium$^{5+}$ (sewage sludge)
bromine with ruthenium$^{3+}$ (urea, wood cellulose and/or fat)
bromine with vanadium$^{5+}$ (wood cellulose and/or manure)
iron$^{3+}$ with cobalt$^{2+}$ (wood cellulose and/or manure)
iodine with ruthenium$^{3+}$ (urea)
iron$^{3+}$ with palladium$^{2+}$ (fat)
bromine with palladium$^{2+}$ (fat)
iron$^{3+}$ with nickel$^{2+}$ (manure0

In practicing the invention, an electrolyte, an electrocatalyst and a homogenous oxidation cocatalyst are combined for oxidizing organic waste material.

The range of electrocatalyst concentration providing a suitable reaction rate is from 0.01M up to 100 percent. The preferred range is 0.1M up to 1.0M. The range of cocatalyst providing an appropriate reaction rate is from 0.0001M to 0.1M. The preferred range is from 0.001M to 0.01M. The preferred ranges provide economy of operation.

Anode materials used in the invention are, for example, platinum, platinum-clad titanium, graphite, reticulated vitreous carbon or platinum plated reticulated vitreous carbon. Suitable anode materials are those materials which do not corrode in the electrolyte and at which the electrode-catalyst redox pair is reversible or quasi-reversible.

Suitable cathode materials are, for example, nickel mesh or platinum or platinum plated reticulated vitreous carbon. Other suitable cathode materials are materials which do not corrode in the electrolyte.

The electrolyte is, for example, phosphoric or sulfuric acid in concentrations varying from 1M to 6M, or potassium sulfate at 0.2M. Other useful electrolytes are those which possess the necessary conductivity, dissolve at least the reduced form of the catalyst, and do not interfere with or poison the catalyst. The electrolyte is made by diluting concentrated sulfuric acid, phosphoric acid or potassium sulfate crystals with water of reasonable purity, e.g. distilled water, deionized water or tap water.

The electrolyte solution optionally has many different compositions. Various other acids which are suitable electrolytes are perchloric acid, hydrochloric acid, hydrobromic acid, hydroiodic acid, nitric acid, boric acid, hydrofluoric acid, or any other strong acid which is not irreversibly degraded in the system. There are a variety of salts which are suitable electrolytes, including sodium or potassium chloride, bromide or iodide, iron chloride, bromide or iodide, sodium or potassium postassium phosphate, sodium sulfate, any of the alkali-metal fluorides, any of the alkali or alkaline-earth nitrates or perchlorates, iron nitrate, iron percholorate, any of the soluble borate salts, any of the soluble aluminum or ammonium salts and any other electrolyte salt or salt mixture which is not irreversibly degraded in the system. The important attributes of the electrolyte are that it is able to solvate at least the reduced form of the electrocatalyst, that it provides a low-resistivity medium between the electrodes and that it does not degrade in the oxidation system.

The operating potential of the system is dependent on the electrocatalyst and the electrolyte. The electrolyte, because of its relatively high concentration, generally determines the form of the electrocatalyst complex (if any), and can shift the redox potential of the electrocatalyst by several tenths of volts. For iron (3+) in 1M phosphoric acid, the standard redox potential is +0.49 volt, and the cell anode is operated at any potential from +0.5 to +1.5 volts or more, versus the normal hydrogen electrode (NHE).

The normal hydrogen electrode (NHE) is an imaginary electrode at which the $H^+/H_2$ redox reaction is perfectly reversible, and which is suspended in solution where the activity of the hydrogen cation is 1.0 and where hydrogen gas at 1.0 atmosphere (activity=1.0) is bubbled over the electrode surface. The potential of this electrode is defined to be 0.000 V, and is the standard of reference for redox potentials of other species. In practice, the electrode is approximated by a piece of plantinized platinum (platinum covered with platinum black) in an acid solution of $H^+$ activity 1.0, while hydrogen gas at 1.0 atmosphere is bubbled over the surface ($H_2$ activity+1.0).

The preferred operating range for iron (3+) in phosphoric acid is +0.5 to +0.8 volt. For iron (3+) in 1.M sulfuric acid, the standard redox potential is +0.69 volt, and the cell anode is suitably operated at any potential from +0.70 to +1.5 volts or more, versus the NHE. The preferred potential range at the anode for iron (3+) in sulfuric acid solution is +0.7 to +1.0 volt. For bromine, the standard redox potential is +1.087 volts, and the cell anode is effectively operated at any potential from +1.0 to +1.5 volts or more, versus the NHE. Preferred potential range for bromine is from +1.0 to +1.2 volts versus the NHE. For iodine, the standard redox potential is approximately +0.47 volt, and the cell anode is operated at any potential from +0.5 to +1.5 volts or more, versus the NHE. The preferred potential range for iodine is from +0.50 to +0.70 volt.

Figure 2:
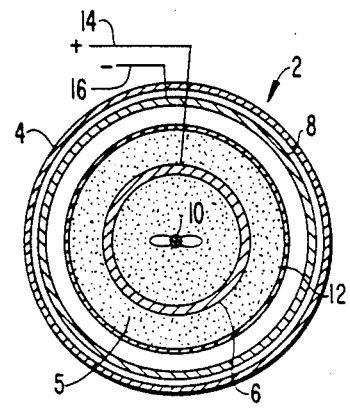
FIG. 2 is a cross-sectional view taken on the plane 2—2 of the cell of FIG. 1.
Figure 3:
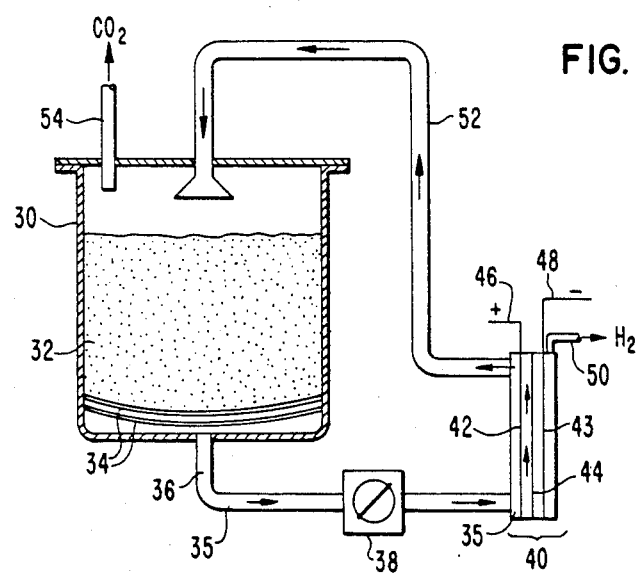
FIG. 3 is a vertical sectional view of apparatus in which the organic reaction area and electrochemical cell are separated.

Referring now to the Figures, FIG. 1 shows an electrochemical cell 2 suitable for practicing the invention. Tank 4 contains electrolyte 5 in which anode 6 and stirrer 10 are immersed. Electrolyte 5 is an electrolyte containing electrocatalyst and homogeneous cocatalyst together with the organic waste material. Anode 6 and cathode 8 are separated by an ion specific or semipermeable membrane 12. Anode 6 is connected to lead 14 and cathode 8 is connected to lead 16. Leads 14 and 16 are connected to a source of electric current (not shown). Gases generated in the cathode compartment are removed through conduit 18, and gases generated in the anode compartment are removed through conduit 20. FIG. 2 is a top view of the electrochemical cell 2, showing circular anode 6, circular cathode 8 and anode electrolyte solution 5 containing the electrolyte, electrocatalyst and homogeneous cocatalyst, together with the organic waste material. Ion specific or semi-permeable membrane 12 is shown as a circular separator between the anode and cathode compartments. FIG. 3 shows tank 30 which contains a mixture 32 of electrolyte, electrocatalyst, homogeneous cocatalyst and organic waste material resting on optional filter screen 34. Organic waste material is reacted with electrolyte and catalyst combination in tank 30, and electrolyte solution 35 flows through exit 36 via pump 38 to electrochemical cell 40, which contains electrolyte solution 35 in which anode 42 is immersed. Anode 42 and cathode 43 are separated by ion specific or semi-permeable membrane separator 44. Anode 42 is connected to lead 46, and cathode 43 is connected to lead 48. Leads 46 and 48 are connected to a source of electric current (not shown). Gases generated at the cathode are led off at exit 50. Solution from the anode compartment is returned by conduit 52 to tank 30 for reuse. Gases generated in tank 30 are withdrawn therefrom through conduit 54. Waste material in tank 30 is mixed with catalyst solution by precolation, spraying, stirring, density gradient or other method. Catalyst which is reduced in tank 30 is reoxidized in electrochemical cell 40 before being returned to tank 30.

The electrocatalyst is regenerated from the reduced form by oxidation at the anode. There may be some reoxidation of reduced cocatalyst at the anode, but this is minimal compared with the reoxidation of the electrocatalyst since the cocatalyst is largely not consumed.

The electrochemical cells shown in FIGS. 1 to 3 are non-limiting examples of the invention. The electrochemical cell may be configured as a cylinder, a sphere or other appropriate shape. The anode compartment is alternatively the inner compartment, the outer compartment, or either compartment in a cell in which the electrodes are planar. The separator is, optionally, an ion-specific membrane or any semipermeable barrier.

Suitable ion-specific membranes include cation-specific membranes, for example, Ionics 61 CZL-386 (manufactured by Ionics, Inc.) and Nafion 423 (manufactured by DuPont). The semi-permeable membrane is, e.g., a microporous plastic, sintered (fritted) glass, a gel, such as agar, or any other material which restricts fluid flow and does not allow intimate mixing of the anolyte and catholyte. The Ionics 61 CZA-386 membrane is a modacrylic fiber-backed cation-transfer membrane. Either an ion-specific or a semi-permeable membrane may be used, but the use of ion-specific membranes leads to higher electrochemical cell efficiency since they strongly limit the diffusion of the electrocatalyst between the catholyte and the anolyte. Semipermeable membranes are generally less expensive but do not provide as much of a barrier to electrocatalyst diffusion, thus lowering the efficiency of the electrochemical cell in comparison with a cell using an ion-specific membrane.

Other operating limitations are principally imposed by the materials used in construction of the reactor system. The system may be built of very inert, strong, expensive materials, such as quartz-lined steel, and operated at relatively high temperatures (100° to 500° C. or more) or it may be made from inexpensive materials, such as polypropylene or polyethylene and ordinary galss, and operated at temperatures of 20° C. to 120° C. Electrode materials must not corrode at the operating temperature of the electrochemical cell. Another limitation is the necessity to operate below the critical temperature of the electrolyte solution being used.

Elevated temperatures are used when oxidizing a refractory organic compound, such as lignin, chitin or a saturated aliphatic hydrocarbon; or when excess heat energy is available at low cost and a lower redox potential electrocatalyst (for example, iron in phosphoric acid, or iodine) can be used to reduce electrical costs. When a lower-potential electrocatalyst has an unacceptable reaction rate at, e.g., 70° C., it is not precluded from oxidizing the organic compound at an adequate rate at, e.g. 250° C. The pressure in the system may vary and is dependent on the nature of the electrolyte and the electrocatalyst. A concentrated sulfuric acid solution does not reach one atmosphere (14.7 psia) vapor pressure until 330° C., and concentrated phosphoric acid has a similar low pressure at elevated temperature. The reaction may be run in molten salt electrolyte at elevated temperatures with no significant overpressure in the reactor.

Potential applied to the anode is kept as low as possible to maximize the energy efficiency of the system. An increase in temperature increases the reaction rate and reduces the necessary size of the reactor for oxidizing a given amount of organic waste material in applications where space is at a premium or rapid oxidation is desired. Operating the anode at a higher potential drives the reaction more quickly but is of limited utility beyond about 0.2 to 0.3 volt more (positive) than the electrocatalyst redox potential. The acidity of the electrolyte solution normally used affects the reaction rate by aiding in the decomposition of the organic waste compounds due to dehydration and other acid catalyzed reactions. With woody organic waste material greater acid concentrations are particularly effective in increasing the electrocatalytic oxidation reaction rate, due to breakdown of the cellulose chains.

For oxidative degradation of organic waste material, catalyst and reactor conditions are chosen to insure maximum conversion of the organic waste to an easily disposable form. Strong acid solutions (6M or more) and active catalysts are selected. Useful combinations for oxidative degradation include:

0.2M iron (3+)/0.001M platinum (4+)/fats, wood cellulose or sewage sludge/6M hydrochloric acid;

0.01M bromine/0.001M ruthenium (3+)/urea fats or wood cellulose/6M sulfuric acid;

0.01M bromine/0.01M vanadium (5+)/wood cellulose or manure/6M sulfuric acid;

0.01M iron (3+)/0.01M vanadium (5+)/sewage sludge/6M hydrochloric or sulfuric acid; and cerium (4+)/platinum (4+)/fats, wood cellulose and many other organics/6M sulfuric or hydrochloric acid.

The temperature of the reactor should preferably be maintained at 100° C. or more for most applications, but for some materials, such as urea, a lower reaction temperature is suitable. The cathode material is suitably platinum, nickel or nickel-plated carbon as well as a variety of other metals or electrode materials with relatively low electrochemical overpotentials. The anode material may be platinum, carbon, platinum-plated carbon, platinum-clad titanium or niobium, or any other electrode material which does not corrode in the catalyst solution and has a relatively low overpotential for the electrocatalyst oxidation. The operating potential at the anode is maintained at +0.5 to +1.5 volts versus the NHE.

Table I, below, tabulates non-limiting examples of organic material, electrocatalyst, homogeneous cocatalyst, electrolyte, reaction rate, and activation energy, particularly pointing out the advantageous effect when a homogeneous cocatalyst is used in combination with an electrocatalyst contrasted with the use of the electrocatalyst alone. The reaction rate is significantly increased using the combination of electrocatalyst and homogeneous cocatalyst of the invention.

In practicing the invention, the mechanism of organic oxidation is changed by addition of the homogeneous cocatalyst to the electrocatalyst and by formation of an electron transfer complex involving the electrocatalyst, homogeneous cocatalyst and the organic waste material. The electron transfer complex has not been characterized but its presence is demonstrated by the reduced activation energies and/or increased reaction rates in the presence of homogeneous cocatalyst as opposed to use of the electrocatalyst alone, as shown in Table I. The use of the combination of electrocatalyst and homogeneous cocatalyst of the invention results in an increase in reaction rate and a decrease in activation energies.

TABLE I

| Organic | Electrocatalyst | Homogeneous Cocatalyst | Electrolyte | Reaction Rate (sec$^{-1}$) | $E_A$ (kcal/mole) |
| --- | --- | --- | --- | --- | --- |
| wood cellulose | iron (III) | none | 6. $\underline{M}$ H$_2$SO$_4$ @ 50° C. | 1.4 × 10$^{-6}$ | 12. |
| wood cellulose | iron (III) | cobalt (II) | 6. $\underline{M}$ H$_2$SO$_4$ @ 50° C. | 4.1 × 10$^{-6}$ | 11.3 |
| wood cellulose | iron (III) | platinum (IV) | 6. $\underline{M}$ H$_2$SO$_4$ @ 50° C. | 3.6 × 10$^{-6}$ | 8.1 |
| beef fat | iron (III) | none | 1.0 $\underline{M}$ H$_2$SO$_4$ @ 20° C. | <1 × 10$^{-9}$ | — |
| beef fat | iron (III) | platinum (IV) | 1.0 $\underline{M}$ H$_2$So$_4$ @ 20° C. | 4.7 × 10$^{-7}$ | 4.5 |
| beef fat | iron (III) | palladium (II) | 1.0 $\underline{M}$ HCl @ 20° C. | 2.2 × 10$^{-6}$ | — |
| urea | iron (III) | none | 1.0 $\underline{M}$ H$_2$SO$_4$ @ 20° C. | 4. × 10$^{-9}$ | — |
| urea | iron (III) | ruthenium (III) | 1.0 $\underline{M}$ H$_2$So$_4$ @ 20° C. | 2.2 × 10$^{-8}$ | — |
| urea | iron (III) | platinum (IV) | 1.0 $\underline{M}$ H$_2$So$_4$ @ 20° C. | 1.2 × 10$^{-6}$ | 4.8 |
| urea | iodine | none | 1.0 $\underline{M}$ H$_2$SO$_4$ @ 20° C. | <1 × 10$^{-9}$ | — |
| urea | iodine | ruthenium (III) | 1.0 $\underline{M}$ H$_2$SO$_4$ @ 20° C. | 5. × 10$^{-9}$ | — |
| urea | bromine | none | 1.0 $\underline{M}$ H$_2$SO$_4$ @ 20° C. | 2.0 × 10$^{-5}$ | — |
| urea | bromine | ruthenium (III) | 1.0 $\underline{M}$ H$_2$SO$_4$ @ 20° C. | 2.6 × 10$^{-4}$ | 8.6 |
| cellulose | bromine | none | 0.2 $\underline{M}$ K$_2$SO$_4$ @ 20° C. | 1.6 × 10$^{-6}$ | — |
| cellulose | bromine | platinum (IV) | 0.2 $\underline{M}$ K$_2$SO$_4$ @ 20° C. | 2.9 × 10$^{-6}$ | — |
| cellulose | bromine | rhodium (III) | 0.2 $\underline{M}$ K$_2$SO$_4$ @ 20° C. | 8.6 × 10$^{-6}$ | — |
| cellulose | bromine | ruthenium (III) | 0.2 $\underline{M}$ K$_2$So$_4$ @ 20° C. | 1.7 × 10$^{-5}$ | 12. |
| cellulose | bromine | none | 6.0 $\underline{M}$ H$_2$SO$_4$ @ 50° C. | 1.6 × 10$^{-5}$ | 10.6 |
| cellulose | bromine | vanadium (V) | 6.0 $\underline{M}$ H$_2$So$_4$ @ 20° C. | 4.7 × 10$^{-5}$ | 11.4 |
| cellulose | none | vanadium (V) | 6.0 $\underline{M}$ H$_2$So$_4$ @ 20° C. | <1. × 10$^{-6}$ | — |
| fat | bromine | none | 0.2 $\underline{M}$ K$_2$SO$_4$ @ 20° C. | 1.9 × 10$^{-6}$ | — |
| fat | bromine | palladium (II) | 0.2 $\underline{M}$ K$_2$So$_4$ @ 20° C. | 2.9 × 10$^{-6}$ | — |
| fat | bromine | ruthenium (III) | 0.2 $\underline{M}$ K$_2$SO$_4$ @ 20° C. | 9.3 × 10$^{-6}$ | 11.1 |
| cattle manure | iron (III) | none | 6.0 $\underline{M}$ H$_2$SO$_4$ @ 50° C. | 4.0 × 10$^{-7}$ | 12.3 |
| cattle manure | iron (III) | platinum (IV) | 6.0 $\underline{M}$ H$_2$SO$_4$ @ 50° C. | 1.1 × 10$^{-6}$ | — |
| cattle manure | iron (III) | cobalt (II) | 6.0 $\underline{M}$ H$_2$SO$_4$ @ 50° C. | 1.2 × 10$^{-6}$ | 8.0 |
| cattle manure | iron (III) | nickel (II) | 6.0 $\underline{M}$ H$_2$SO$_4$ @ 50°C. | 8.0 × 10$^{-7}$ | — |
| cattle manure | bromine | none | 6.0 $\underline{M}$ H$_2$SO$_4$ @ 50° C. | 7.6 × 10$^{-6}$ | 10.0 |
| cattle manure | bromine | vanadium (V) | 6.0 $\underline{M}$ H$_2$SO$_4$ @ 50° C. | 1.1 × 10$^{-5}$ | 5.1 |
| sewage sludge | iron (III) | none | 6.0 $\underline{M}$ H$_2$SO$_4$ @ 50° C. | 1.2 × 10$^{-6}$ | 18.7 |
| sewage sludge | iron (III) | vanadium (V) | 6.0 $\underline{M}$ H$_2$SO$_4$ @ 50° C. | 3.8 × 10$^{-6}$ | 13.3 |

The invention is further illustrated by the following examples in which all parts and percentages are by weight unless otherwise indicated. These non-limiting examples are illustrative of certain embodiments designed to teach those skilled in the art how to practice the invention and represent the best mode contemplated for carrying out the invention.

EXAMPLES

Example 1

A catalyst solution of 6.0M sulfuric acid containing 0.2M iron (III) and 0.01M cobalt (II) is prepared by diluting 0.330 liter of concentrated sulfuric acid, 40 grams of iron (III) sulfate and 1.55 grams of cobalt (II) sulfate to 1 liter with water. The resulting solution is stirred to dissolve the salts thoroughly. A 600 ml portion of this solution is then transferred to the anode half-cell of FIG. 1; a solution of 1.0M sulfuric acid is added to the cathode half-cell. These two solutions are the anolyte and the catholyte, respectively. The anode is a platinum-clad titanium wire mesh formed into a cylindrical shape, and is totally immersed in the solution. The cathode is a cylinder formed of fine nickel wire mesh, and is also totally immersed in the solution. A Teflon®-coated stirring bar is used to agitate the solution in the anode half-cell. An Ionics 61 CZL-386 cation-specific membrane is used to separate the two half-cells. Approximately 6 grams of sawdust, or other source of cellulose, is added to the anode half-cell, following which the cell tank is sealed and heated to 70° C. A D.C. potential of approximately 1.0 V is applied across the electrodes giving a current of approximately 16.8 miliamperes (Reaction rate constant = $1.5 \times 10^{-6}$ sec$^{-1}$, activation energy = 11 kcal/mole). The cell pressure in this case is a little over one atmosphere. Analysis of the gaseous products from the anode half-cell shows only carbon dioxide. The optimum size for a reactor under these conditions is an anode half-cell chamber of 4,000 to 16,000 liters (volume), assuming the cylindrical shape of FIG. 1 with approximately 25% of the total volume occupied by the cellulosic material and the reactor head space.

Example 2 mine liquid and 0.21 grams of ruthenium (III) chloride to one liter with water. A 600 ml portion of this solution is transferred to the anode half-cell of FIG. 1, and a solution of 0.5M sulfuric acid is added to the cathode half-cell. The anode is a platinum-clad titanium wire mesh formed into a cylindrical shape, and is totally immersed in the solution in the anode half-cell. The cathode is a cylinder formed of fine nickel wire mesh, and is totally immersed in the solution in the cathode half-cell. A Telfon®-coated stirring bar is used to agitate the solution in the anode half-cell, and an Ionics 61 CZL-386 cation-specific membrane is used to separate the two half-cells. Approximately 6 grams of fat is added to the anode half-cell, following which the cell tank is sealed and heated to 70° C. A D.C. potential of approximately 1.25 V is applied across the electrode, giving a resultant steady state current of approximately 15 milliamperes (Reaction rate constant = $2.6 \times 10^{-4}$ sec$^{-1}$, activation energy = 11 kcal/mole). Pure carbon dioxide is produced in the anode half-cell at almost 100 percent efficiency.

Further examples of systems operated at higher temperatures are shown in Table II.

TABLE II

EXAMPLES OF SYSTEMS AT HIGHER TEMPERATURES

| Electrocatalyst | Cocatalyst | Electrolyte Medium | Temperature | Pressure |
| --- | --- | --- | --- | --- |
| 0.2 M Iron (III) | 0.001 M Platinum (IV) | 6 M $H_2SO_4$ | 100.° C. | <15 psia |
| 0.2 M Iron (III) | 0.01 M Cobalt (II) | $H_2SO_4$ | 330.°C. | ~15 psia |
| 0.2 M Iron (III) | 0.01 M Vanadium (V) | $H_3PO_4$ | 200.° C. | <15 psia |
| Bromine | 0.01 M Vanadium (V) | HBr | 225.° C. | ~2000 psia |
| 0.2 M Iron (III) | 0.001 M Platinum (IV) | $AlCl_3$ | 200.° C. | ~40 psia |
| Bromine | 0.001 M Ruthenium (III) | 6 M $H_2SO_4$ | 110. ° C. | ~30 psia |
| Iodine | 0.01 M Copper (I) | $H_2So_4$ | 265.° C. | ~75 psia |
| 0.2 M Cesium (IV) | 0.001 M Palladium (II) | 6 M NaCl | 225.° C. | ~300 psia |

The reactor tank of FIG. 3 is loaded with a supported bed of 500 grams of wood chips over filters of 1.0 mm and 0.25 mm Teflon® screen. A solution of 6.0M sulfuric acid containing 0.2M iron (III) and 0.01M cobalt (II) is prepared by diluting 3.3 liters of concentrated sulfuric acid, 400 grams of iron (III) sulfate and 15.5 grams of cobalt (II) sulfate to 10 liters with water. The solution is agitated to dissolve the salts and then transferred into the reactor tank. The electrodes in the electrochemical cell are a 20 pores/inch reticulated vitreous carbon (RVC) anode and a platinum-plated 20 pores/inch RVC cathode, separated by a Nafion® 423 cation-specific membrane. A potential of 1.0 volt is applied across the electrodes. The reactor tank is sealed, and the catalyst solution is pumped from the tank through the electrochemical cell and back into the tank. The reactor tank is heated to about 80° C., giving steady state current levels of approximately 2.0 amperes. The reaction tank volume is about twice the volume of the solution in liters, and the reaction rate is about $1 \times 10^{-5}$ sec$^{-1}$. Total reaction time is dependent on the flow rate. With a flow rate of 4 liters/sec, a reaction tank volume of 20 liters and a tank loading of 500 grams wood chips, total reaction is achieved in about 46 hours. The electrochemical cell operates at 95+ percent efficiency and the biomass tank produces essentially pure carbon dioxide.

Example 3

A catalyst solution of $1.0 \times 10^{-3}$M bromine (as $Br_2$) and $1.0 \times 10^{-3}$M ruthenium (III) is prepared by diluting 27.5 ml of concentrated sulfuric acid, 0.05 ml of bro- Variations and modifications may be effected within the scope of the invention as described above, and as defined in the appended claims. Throughout the disclosure and claims all references to "homogeneous cocatalyst" mean that the cocatalyst is substantially uniformly dispersed throughout the electrolyte.

What is claimed is:

1. A method for gasifying organic waste which comprises:
   combining organic waste material with electrolyte,
   conducting an electrocatalytic reaction between the organic waste material and the electrolyte, and
   maintaining an electrochemical potential across an anode and a cathode in an electrochemical cell containing the electrolyte,
   the electrolyte containing a catalyst combination of (a) electrocatalyst and (b) homogeneous cocatalyst.

2. A method of claim 1 wherein the electrocatalyst is a member selected from the group consisting of cerium (4+) complex, iron (3+) complex, bromine and iodine.

3. A method of claim 1 wherein the homogeneous cocatalyst is a member selected from the group consisting of platinum (4+) ion complex, ruthenium (3+) ion complex, rhodium (3') ion complex, nickel (2+) ion complex, cobalt (2+) ion complex, palladium (2+) ion complex and vanadium (5+) oxide complex.

4. A method of claim 3 wherein the electrocatalyst is a member selected from the group consisting of cerium (4+) complex, iron (3+) complex, bromine and iodine.

5. A method of claim 1 comprising admixing the organic waste material with the electrolyte and catalyst composition in the electrochemical cell.

6. A method of claim 1 comprising separating the anode from the cathode in the electrochemical cell by interposing an ion-specific membrane therebetween.

7. A method of claim 1 comprising separating the anode from the cathode in the electrochemical cell by interposing a semi-permeable membrane therebetween.

8. A method of claim 1 comprising treating the organic waste material in a tank, circulating electrolyte solution containing the catalyst combination in reduced form to the electrochemical cell for reoxidation of the electrocatalyst and homogeneous cocatalyst, and recirculating the electrolyte containing electrocatalyst and homogeneous cocatalyst to the tank for treating organic waste material.

9. A method of claim 8 comprising separating the anode from the cathode in the electrochemical cell by interposing an ion-specific membrane therebetween.

10. A method of claim 8 comprising separating the anode and the cathode in the electrochemical cell by interposing a semipermeable membrane therebetween.

11. A method of claim 8 comprising dissolving the catalyst combination in its reduced form in the electrolyte solution.

12. A method of claim 1 which is carried out at 0° C. to 500° C.

13. A method of claim 1 wherein the anode is constructed of a material selected from the group consisting of platinum, platinum-doped carbon, platinum-clad titanium, niobium, graphite, reticulated vitreous carbon and platinum-plated reticulated vitreous carbon.

14. A method of claim 1 wherein the cathode is constructed of a material selected from the group consisting of platinum, platinum plated reticulated vitreous carbon, platinum-doped carbon, platinum-clad titanium, niobium, nickel and nickel-doped carbon.

15. A method of claim 1 wherein the anode is maintained at an operating potential of +0.5 to +1.5 volts, versus that of the normal hydrogen electrode.

16. A method of claim 1 comprising treating the organic waste material in the electrochemical cell.

17. A method of claim 1 wherein the catalyst combination increases the reaction rate by an amount greater than that attributable to the additive effect of said electrocatalyst and said homogeneous cocatalyst, when each is used alone.

18. A method of claim 1 wherein the catalyst composition decreases the activation energy of the reaction by an amount greater than that attributable to the additive effect of said electrocatalyst and said homogeneous cocatalyst, when each is used alone.

19. A method of claim 6 wherein the ion-specific membrane is a cation specific membrane.

20. A method of claim 9 wherein the ion-specific membrane is a cation specific membrane.

21. A process for gasifying organic waste which comprises combining organic waste material with electrolyte containing a catalyst combination comprising (a) an electrocatalyst and (b) a homogeneous cocatalyst, and maintaining an electrochemical potential across an anode and a cathode in an electrochemical cell containing the electrolyte and the catalyst combination, the process being effected at a reaction rate, at a given temperature, which is attributable to the catalyst combination and which is greater than the sum of catalytic effects of respective components of said catalyst combination.

22. A process for gasifying organic waste which comprises combining organic waste material with electrolyte containing a catalyst combination comprising (a) an electrocatalyst and (b) a homogeneous cocatalyst, and maintaining an electrochemical potential across an anode and a cathode in an electrochemical cell containing the electrolyte and the catalyst combination, wherein, at a givven temperature, obtained reaction activation energy required to oxidize the organic waste material is decreased a greater amount by the catalyst combination than by the combined catalytic effects of each component of said catalyst combination.

* * * * *